(12) United States Patent
Bueter

(10) Patent No.: US 12,313,094 B2
(45) Date of Patent: May 27, 2025

(54) PISTON UNIT OF A WORKING CYLINDER

(71) Applicant: Bümach Engineering International B.V., Emmen (NL)

(72) Inventor: Josef Bueter, Haren/Altenberge (DE)

(73) Assignee: Bümach Engineering International B.V., Emmen (NL)

( * ) Notice: Subject to any disclaimer, the term of this patent is extended or adjusted under 35 U.S.C. 154(b) by 0 days.

(21) Appl. No.: 18/256,070

(22) PCT Filed: Dec. 7, 2021

(86) PCT No.: PCT/DE2021/000192
§ 371 (c)(1),
(2) Date: Jun. 6, 2023

(87) PCT Pub. No.: WO2022/122063
PCT Pub. Date: Jun. 16, 2022

(65) Prior Publication Data
US 2024/0035496 A1 Feb. 1, 2024

(30) Foreign Application Priority Data

Dec. 11, 2020 (DE) ............ 20 2020 005 143.8

(51) Int. Cl.
*F15B 15/14* (2006.01)
*F16B 33/02* (2006.01)
(Continued)

(52) U.S. Cl.
CPC ...... *F15B 15/1452* (2013.01); *F15B 15/1447* (2013.01); *F16B 33/02* (2013.01); *F16J 1/12* (2013.01); *F16J 7/00* (2013.01)

(58) Field of Classification Search
CPC . F15B 15/1447; F16J 1/005; F16J 1/12; F16J 7/00; F16B 33/02
See application file for complete search history.

(56) References Cited

U.S. PATENT DOCUMENTS 3,062,568 A * 11/1962 Andresen ............ E21B 17/043
285/392
3,652,111 A * 3/1972 Dent ............ B21D 39/04
29/517

(Continued)

FOREIGN PATENT DOCUMENTS

FR 2755739 A1 5/1998
GB 890156 A 2/1962

(Continued)

OTHER PUBLICATIONS

KR20190129281A_t machine translation thereof (Year: 2019).*

*Primary Examiner* — Matthew Wiblin
(74) *Attorney, Agent, or Firm* — Laurence A. Greenberg; Werner H. Stemer; Ralph E. Locher

(57) ABSTRACT

A piston unit of a working cylinder includes a piston rod that has an outer thread on a piston-side coupling portion. A piston has an axial bore which has an inner thread and in which the piston rod is received. The outer thread and the inner thread define a common thread portion. The outer thread and the inner thread have a complementary conicity and a complementary thread geometry. The conicity has a conicity angle alpha of 0.3 to 5 degrees. The outer thread and the inner thread abut one another in a coupling end position in the thread portion in a gap and define a sealing plane. The outer thread and the inner thread have, in the thread portion in the coupling end position, an elastic deformation within the elastic limit of the piston rod and the piston. The elastic deformation is brought about by a surface pressure via a tightening torque. The piston rod and the piston are radially and axially fixed to one another without play in the coupling end position by the elastic deformation, and the elastic (Continued)

deformation is within the elastic limit both with and without an application of pressure by a pressure medium in the working cylinder.

4 Claims, 3 Drawing Sheets

(51) Int. Cl.
*F16J 1/12* (2006.01)
*F16J 7/00* (2006.01)

(56) References Cited

U.S. PATENT DOCUMENTS

| | | | | |
|---|---|---|---|---|
| 4,072,434 A * | 2/1978 | Homuth | ............... | F16J 1/12 |
| | | | | 403/253 |
| 8,131,204 B2 * | 3/2012 | Kadota | ............ | G03G 15/238 |
| | | | | 399/364 |
| 9,958,069 B2 | 5/2018 | Bueter | | |
| 10,865,815 B2 | 12/2020 | Bueter | | |
| 2012/0171038 A1 * | 7/2012 | Laursen | ............ | F16B 33/02 |
| | | | | 416/214 R |
| 2017/0175796 A1 * | 6/2017 | Frutschy | ............ | F16B 31/02 |
| 2022/0127911 A1 * | 4/2022 | Wickander | ........... | F16L 15/06 |

FOREIGN PATENT DOCUMENTS

| | | | | |
|---|---|---|---|---|
| JP | 2016056846 A | | 4/2016 | |
| KR | 20190129281 A | * | 11/2019 | ............ F16B 33/02 |
| WO | 2018113810 A1 | | 6/2018 | |

* cited by examiner

PISTON UNIT OF A WORKING CYLINDER

The invention relates to a piston unit of a working cylinder.

FIELD AND BACKGROUND OF THE INVENTION

From the prior art, various possibilities are known for working cylinders to establish the connection of the piston to the piston rod.

In one solution, the piston is welded with the piston rod and thus a positive substance connection is produced. In addition, it is known to establish the positional relationship and power transmission between the piston and the piston rod by means of positive locking couplings.

The disadvantage of these connections is that notch effects occur at the moulded sections and, at the same time, a seal must be installed additionally in order to seal the working chambers, which are separated by the piston, against each other in the working cylinder.

A solution is known from U.S. Pat. No. 9,958,069 B2 in which a coupling is provided by a combination of a force-fit and positive locking connection. For this purpose, the piston and the piston rod each have a circumferential groove opposing each other in which a resilient piston ring is arranged and produces an axial positive locking connection. In addition, the piston and piston rod have a press fit for a force-fit connection. When the force fit is overcome by a maximum operating pressure, the positive locking connection becomes effective by means of the resilient piston ring, so that it blocks a further relative axial movement of piston and piston rod in a clearance end position. The fixation of the positional relationship between the piston and the piston rod prevents a possibly life-limiting axial movement. This solution enables the provision of piston units in high quality and with high reliability. On the other hand, this coupling is comparatively demanding in terms of manufacture.

SUMMARY OF THE INVENTION

The object of the invention is to produce a simple, spatially compact and at the same time operationally reliable connection between piston and piston rod, which should also be easy to manufacture and provides an unfailing seal between the working chambers separated by the piston.

The object is solved by the features indicated in the independent claim. Preferred further embodiments result from the dependent claims.

The piston unit of a working cylinder according to the generic type has a piston rod and a piston. Piston rod and piston are hereinafter also referred to collectively as the coupling partners.

The piston rod has an outer thread at a coupling section on the piston side. The piston is provided with an axial bore in which the piston rod is received. The axial bore has an inner thread.

The outer thread of the piston rod and the inner thread of the piston form a common thread section. Preferably, the common thread section extends substantially along the entire length of the outer thread and the inner thread.

In the coupled state, the piston is screwed onto the piston rod.

According to the invention, the outer thread and the inner thread have a taper (conicity). Thus, the diameter of the outer thread is larger at its proximal end than at its distal end. Furthermore, it is essential to the invention that the taper of the outer thread and the inner thread match and that the taper has a taper angle alpha of 0.3 to 5 degrees relative to a main longitudinal axis of the piston rod.

The outer thread and the inner thread are hereinafter also referred to collectively as the thread partners.

In addition, the outer thread and the inner thread have a matching thread geometry according to the invention. Due to the matching thread geometry, the thread partners are designed in such a manner that they abut against each other without any clearance in a coupling end position in the common thread section and form a sealing plane. This positive locking connection of the thread partners leads to a largely homogeneous surface pressure on the thread flanks and a large-area form fit.

The outer thread and the inner thread are elastically deformed in the thread section in the coupling end position. According to the invention, the elastic deformation is within the elastic limits of the piston rod and piston. The elastic deformation is caused by a surface pressure through a tightening torque. By means of a tightening torque, the axial positional relationship of the coupling partners is adjusted towards each other by means of the thread partners so that an oversize of the diameter of the piston rod relative to the piston is formed in the common thread section by the taper according to the invention by means of a wedge effect. This oversize causes the press fit and the elastic deformation of the thread partners.

According to the invention, the elastic deformation exists within the elastic limits both without and with pressure application of a pressure medium in the working cylinder.

By means of the elastic deformation, the piston rod and the piston are fixed to one another radially and axially without clearance in the coupling end position according to the invention. Thus, the piston is fixed exactly on the piston rod.

The solution according to the invention has in particular the advantages described below.

Surprisingly, the following was found. Due to the radial pressure applied between the thread partners by means of the torque, a concentric radial elastic deformation is primarily achieved on the piston rod and an eccentric radial elastic deformation is achieved on the piston. In addition to the primary radial elastic deformation, a small secondary axial elastic deformation is also achieved at the piston rod and at the piston, wherein they are advantageously oriented in opposite directions. It is an axial elastic elongation of the piston rod and an axial elastic compression of the piston. Thus, the outer thread and the inner thread are axially tensioned against each other in opposite directions in the proximal section of the common thread section and in the distal section of the common thread section. Regarding an axial tension, a neutral zone is formed in the middle section of the common thread section between the proximal and distal sections. Thanks to the opposing axial elastic tension, it is also advantageously achieved that a deformation remains within the elastic limits not only in the case of an axial load application by the operating forces during intended use, but also without a load application due to the elastic pretension. Moreover, it is advantageous that this applies independently of the direction of the axial force application.

Due to the elastic pretension, the piston is thus advantageously fixed radially and axially without clearance on the piston rod in all load conditions. In the event of a force or movement reversal of the piston unit, an axial movement of the piston on the piston rod is reliably excluded.

As a further advantage of the solution according to the invention, the surface pressure on the thread flanks is maintained due to the elastic pre-tension and the positive locking connection of the thread flanks, irrespective of the operating state, so that the piston is prevented from turning loose. Advantageously, no further securing element against turning loose is required.

Furthermore, the taper according to the invention leads to the advantage that notch effects on the piston rod are reduced due to a larger thread diameter at the proximal end of the outer thread and a smaller diameter at the distal end. In the case of bending stresses, this diameter ratio results in a better distribution of the tensions in the piston rod in the coupling area.

Furthermore, a sealing effect is advantageously achieved due to the clearance-free manner of the thread geometry of the outer thread and the inner thread. Advantageously, the effects of a labyrinth seal are utilized. In addition, if a fluid pressure medium is used, the surface tension will prevent the pressure medium from flowing beyond the common thread section.

It is particularly advantageous that all functions are provided by the conical thread pairing at the specified taper angle in conjunction with the elastic pretension and the thread geometry and thus by the same technical means. The functions of mechanical coupling and the sealing function are integrated in particular.

Due to this high level of functional integration, the piston is also very compact in its design and thus provides advantageous savings in installation space and material.

Furthermore, it is advantageous that additional parts are not required apart from the piston rod and the piston. The piston unit according to the invention is advantageously easy to manufacture. It is easier to position the two joining partners relative to each other at the beginning of the joining process, since the individual thread flanks already fit into each other and find each other. Furthermore, the thread can still be easily screwed until the positive locking connection is achieved.

In addition, the piston unit according to the invention can be a piston unit for different types of working cylinders, such as, but not limited to, differential working cylinders, traction cylinders, damping cylinders or pneumatic cylinders.

In a first advantageous further development, the taper has a taper angle alpha of 0.5 to 1.5 degrees. The taper exists along the entire axial length of the thread. The average thread diameter is tapered along the entire axial length. It was found that the geometries at this taper angle provide a particularly advantageous ratio of the described radial and axial elastic deformations according to the invention.

In another advantageous further development, the thread flanks have an inclination angle beta of 55 to 100 degrees. According to this further embodiment, the thread flank shape is provided in the transition range from an acute to an obtuse angle. Sufficient lateral guidance is achieved during screwing in, so that the two joining partners do not get jammed. In addition, the thread flank is sufficiently stable to absorb the surface pressure and the axial load.

According to a particular advantageous further development, a sealing body is arranged in the thread section in the inner thread area of the piston.

A radial inner ring surface of the sealing body has a sealing body thread section which forms an axial subsection of the inner thread section of the piston.

For this purpose, a sealing body is preferably inserted in a recess in the piston. It can preferably be made of an elastic material such as plastic or rubber. It can be inserted as a dimensionally stable body or injected as a hardening, liquid component. In one further development, the outer thread of the piston rod automatically cuts into the sealing body in the inserted or hardened form during joining, so that the sealing body thread section is formed on its radial inner ring surface.

In another variant, the sealing body has a sealing body thread section already provided before joining. In particular, the sealing body can preferably be assembled without the sealing body thread section, so that the inner thread of the piston and at the same time the sealing body thread section can subsequently be produced in one common operation.

According to this further development, the taper of the outer thread of the piston rod and the taper of the sealing body thread section advantageously act together. By screwing the piston rod more and more into the piston, the outer thread and the sealing body section are radially pressed against each other and seal against each other.

This further development discloses a solution by means of which a reliable seal can be achieved in special cases, too. This applies in particular to gaseous pressure media which do not form any boundary surfaces with a surface tension, so that the solution can also be used for piston units of pneumatic cylinders.

The invention is described as an exemplary embodiment in more detail by the following figures:

DETAILED DESCRIPTION OF THE INVENTION

Figure 1:
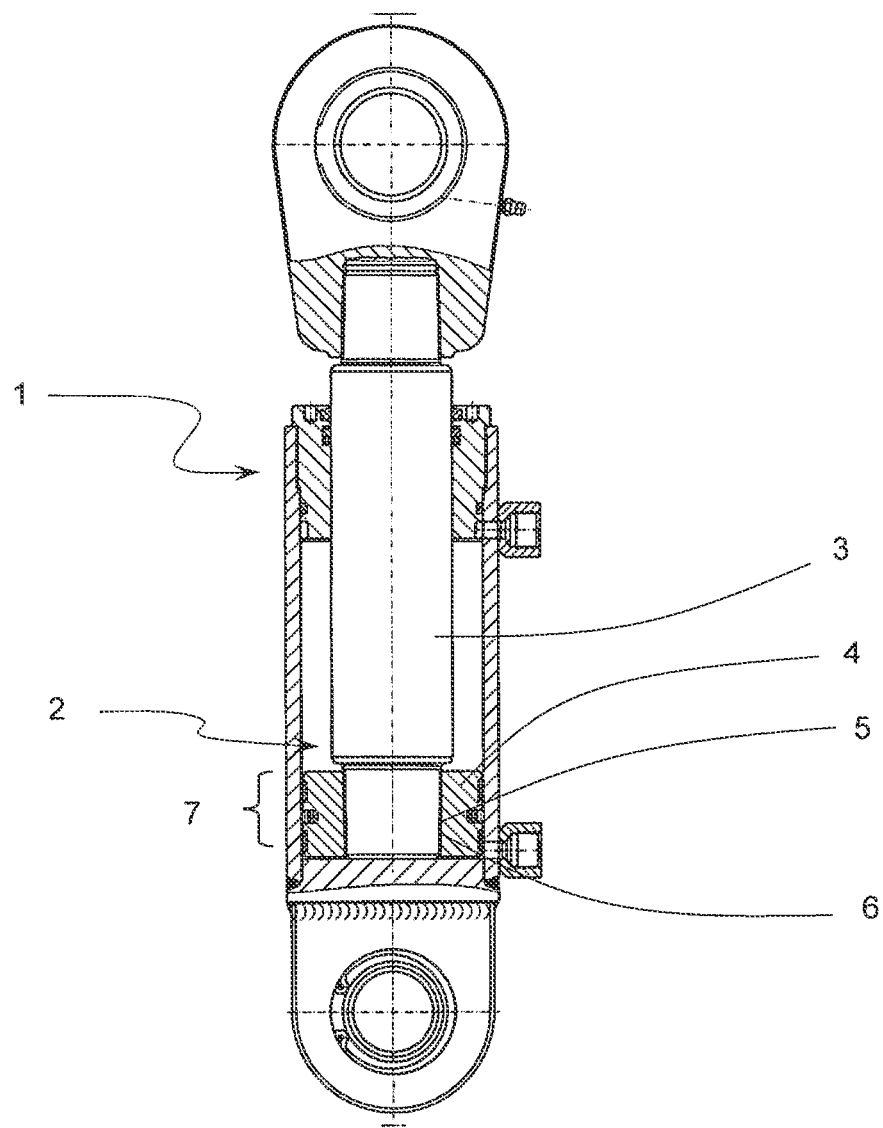
FIG. 1 Sectional view of the working cylinder with piston unit

Hereinafter, the use of the reference numerals in the figures and in the associated description sections is consistent in the following, even if not all figures are provided with all reference numerals.

FIG. 1 shows a sectional view of the working cylinder 1. In this example, it is a double-acting hydraulic cylinder designed as a differential working cylinder.

It has, in particular, a piston unit 2. The piston unit 2 is composed of the piston rod 3 and the piston 4. A conical outer thread 5 is provided at the piston rod 3 at one end on the piston side. The piston 4 is screwed onto this conical outer thread 5 by means of the inner thread 6. The inner thread also has a taper. The taper angle α of both the outer thread 5 and the inner thread 6 is 1 degree. The outer thread 5 and the inner thread 6 engage into each other in a common thread section 7.

Figure 2:
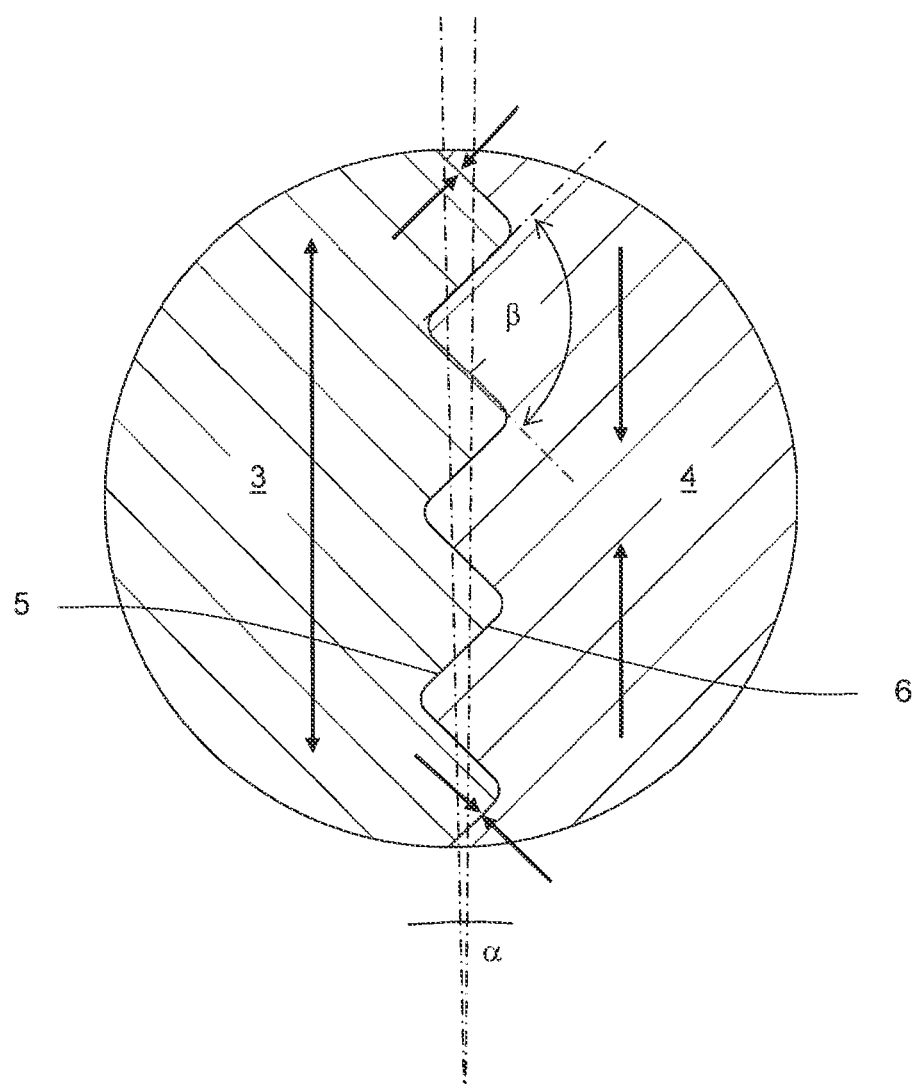
FIG. 2 Detailed sectional view of the thread section

FIG. 2 shows the detailed view of a part of the common thread section 7. The thread shape of the outer thread 5 of the piston rod 3 is the same as the thread shape of the inner thread 6, so that they abut against each other without any clearance. The inclination angle β is 90 degrees and the taper angle α is 0.75 degrees.

The basic shape of both threads 5, 6 formed by the average thread diameter is conical along the axial thread length. The conical shape of both threads 5, 6 allows the piston 4 to be screwed onto the piston rod 3 up to a certain position. After that, the thread flanks form a positive locking connection which also has a fluid-sealing effect. In addition, the screw-in path is continued by applying a tightening torque until a radial concentric elastic deformation of the piston rod 3 and a radial eccentric elastic deformation of the piston 4 are produced. At the same time, an axial elastic deformation of the piston rod 3 is effectuated as an elongation and an axial elastic deformation of the piston 4 is effectuated as a compression. The axial elastic deformations are indicated by the vertical arrows. The diagonal arrows pointing to each other indicate the additional surface pressure on the thread flanks and thus the elastic axial tension between the piston rod 3 and the piston 4.

Figure 3:
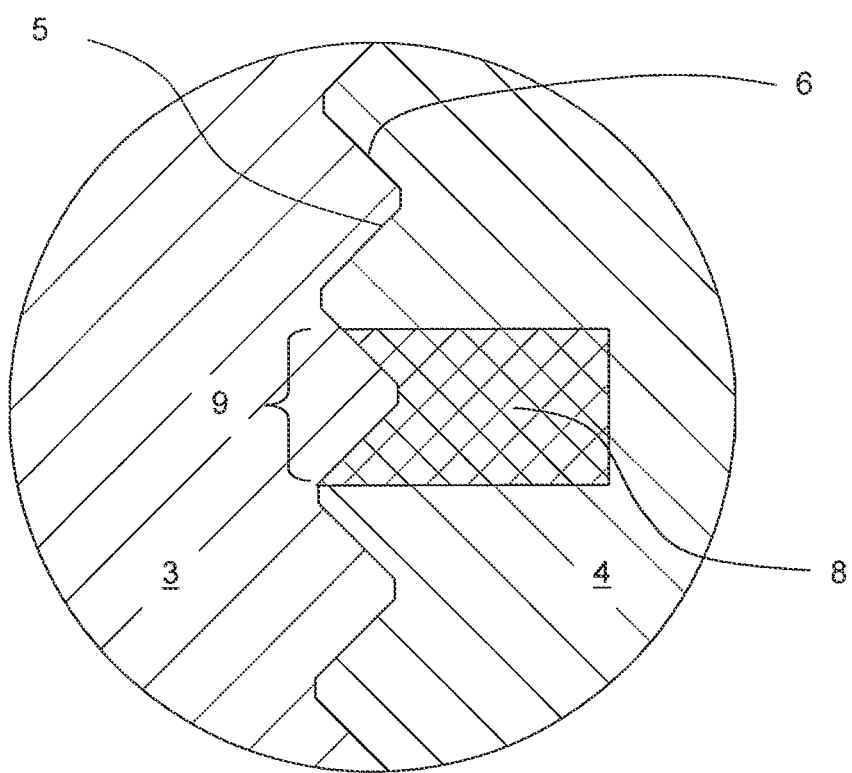
FIG. 3 Detailed sectional view of the thread section with sealing body

FIG. 3 shows the detailed view of a part of the common thread section 7 in an exemplary embodiment provided with a sealing body 8 that has a sealing body thread section 9. With the exception of the sealing body 8, the basic structure corresponds to FIGS. 1 and 2, so that in this respect reference is additionally made to these figures and the associated description sections.

Furthermore, FIG. 3 shows an exemplary embodiment in a further variant of the geometry of the outer thread 5 and the inner thread 6. The thread tips and thread sinks are flattened here and form a trapezoidal thread. A positive locking and clearance-free thread engagement is also achieved here.

In addition, a sealing body 8 is inserted into a recess in the inner lateral surface of the axial bore in the piston 4. This body is made of an elastomeric material. The outer thread of the piston rod 3 abuts in a corresponding manner against that of the sealing body 8 in a press fit. This design produces a sealing and positive locking connection.

LIST OF REFERENCE NUMERALS 1 working cylinder
2 piston unit
3 piston rod
4 piston
5 outer thread
6 inner thread
7 common thread section
8 sealing body
9 sealing body thread section
α taper angle alpha
β thread flank inclination angle beta

The invention claimed is:

1. A piston unit of a working cylinder, comprising:
a piston rod and a piston, said piston rod having an outer thread at a coupling section on a piston side thereof, said piston having an axial bore having an inner thread, said axial bore receiving said piston rod therein, said outer thread and the inner thread defining a common thread section;
said outer thread and said inner thread each having a respective taper, said taper of said outer thread and said taper of said inner thread matching with one another, said tapers having a taper angle of 0.3 to 5 degrees relative to a main longitudinal axis of said piston rod, said outer thread and said inner thread having a matching thread geometry;
said outer thread and said inner thread being constructed for abutting against each other in a clearance-free manner in said common thread section when in a coupling end position and defining a sealing plane by the clearance-free manner;
said outer thread and said inner thread having an elastic deformation within the elastic limits of said piston rod and said piston with said common thread section in the coupling end position, the elastic deformation occurring by a surface pressure through a tightening torque, and in the coupling end position, said piston rod and said piston being fixed to one another radially and axially without clearance by the elastic deformation and the elastic deformation being within the elastic limits with and without pressurization by a pressure medium in the working cylinder;
a sealing body with a radial inner ring surface, said sealing body arranged in the thread section in the inner thread of the piston, and said radial inner ring surface of the sealing body having a sealing body thread section defining an axial subsection of said common thread section; and
a recess arranged centrally in said common thread section with respect to an axial direction of the piston unit, said sealing body being disposed in said recess.

2. The piston unit of the working cylinder according to claim 1, wherein said taper angle is 0.5 to 1.5 degrees.

3. The piston unit of the working cylinder according to claim 1, wherein thread flanks of said inner and outer threads have an inclination angle of 55 to 100 degrees.

4. The piston unit of the working cylinder according to claim 1, wherein said common thread section extends from both axial ends of said sealing body.

* * * * *